Sept. 24, 1963 R. A. MUNSE 3,104,739
MOLDING CLIP
Filed Sept. 15, 1960
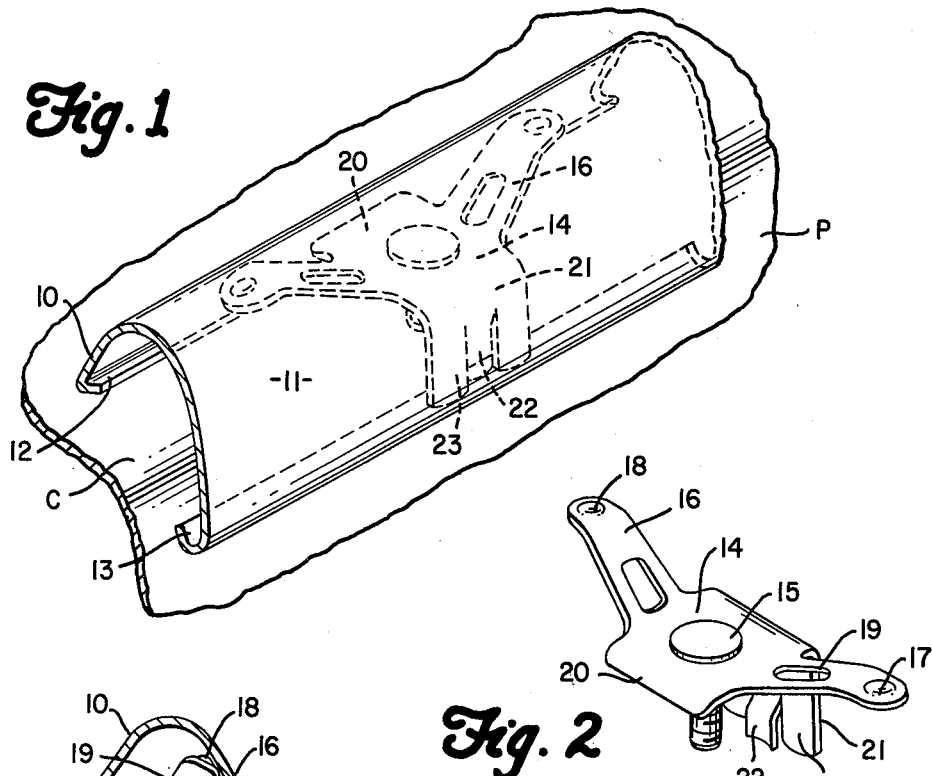
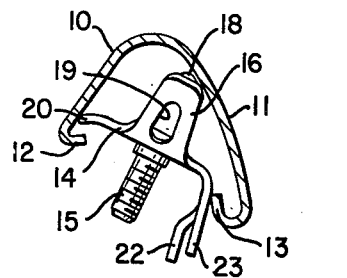
Fig. 3
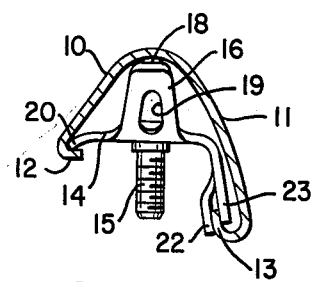
Fig. 5
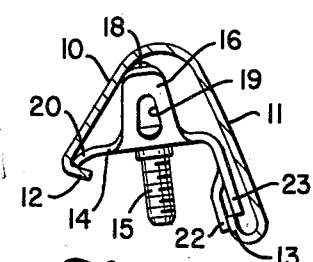
Fig. 4
INVENTOR.
ROBERT A. MUNSE
BY Malcolm W. Fraser
ATTORNEY

United States Patent Office 3,104,739
Patented Sept. 24, 1963

3,104,739
MOLDING CLIP
Robert A. Munse, Perrysburg, Ohio, assignor to The Bishop and Babcock Corporation, Cleveland, Ohio, a corporation of Ohio
Filed Sept. 15, 1960, Ser. No. 56,306
1 Claim. (Cl. 189—88)

This invention relates generally to sheet metal clips, but more particularly to resilient clips and designed for anchoring a channel-shaped molding having inturned flanges to a supporting panel, such for example as an automobile body.

The clip, according to the present invention, is designed particularly for anchoring a channel-shaped molding strip having inturned flanges in a predetermined position on a sheet metal panel. In this case the supporting panel is not of flat construction but is exteriorly curved, requiring a molding strip of a definite contour to conform to the lines of the body. The clip is so constructed as to accommodate and retain the molding strip along the curved panel portion.

An object is to produce a sheet metal resilient molding clip of the above character that can be inexpensively constructed, readily applied in position of use, and is efficient in service.

Other objects and advantages of the invention will hereinafter appear, and for purposes of illustration but not of limitation, an embodiment of the invention is shown on the accompanying drawings in which:

FIGURE 1 is a perspective view of a fragment of a supporting panel and a molding strip, the sheet metal clip for retaining the molding strip to the supporting panel being shown by broken lines;

FIGURE 2 is a perspective view of the clip;

FIGURE 3 is an end elevation of the clip, the molding strip being shown in transverse section and indicating the manner in which the molding strip is initially applied to the clip;

FIGURE 4 is a view similar to FIGURE 3, showing the molding strip rocked about the clip to position both inturned flanges of the molding strip operatively with respect to the clip; and FIGURE 5 is a view similar to FIGURES 3 and 4, but showing the molding strip in finally attached position upon the clip.

The illustrated embodiment of the invention comprises an elongate sheet metal molding strip, the body of which has a downwardly and outwardly inclined inner side wall portion 10 and a downwardly and outwardly inclined front or outer wall portion 11, the two portions being integrally joined by a curved wall to provide in cross section a generally dome-shaped structure. On the free edge of the wall portion 11 is an upwardly curved hook-like flange 13. It will thus be apparent that the molding strip is not of uniform cross section, but is irregular in order to fit the contour of a body panel P which is formed with a longitudinally elongate outwardly extending downwardly curved portion C. It is desired that the flanged edge 12 of the molding strip engages the horizontally disposed portion of the panel P above the curved portion C, fit over the rounded portion C and that the hook-like flange 13 engages the body panel below the rounded portion C. In order to secure the molding strip to the panel in the position indicated, a series of clips are secured to the panel at spaced intervals although only a single clip is illustrated.

Each molding clip is formed of a one-piece sheet metal part and has a substantially rectangular flat body 14, which in this instance is provided with an opening substantially at the center to receive a stud bolt 15 which extends through a suitable hole formed in the panel P and receives a nut on the underside of the panel for securing the clip in position. It is to be understood that other forms of securement may be provided, such as a screw, a screw-receiving impression in the body 14, a self-threading element, and the like. On opposite sides of and integral with the body 14 is a pair of upwardly and outwardly inclined resilient arms 16, which terminate in downwardly bent substantially flat terminal portions 17 disposed approximately parallel to the body 14. Each of the terminal portions 17 is provided with an upwardly extending rounded nubbin 18. In order to enhance the flexibility of the arms, each arm is provided with an elongate cut-out 19.

On one edge portion of the body 14 and coextensive therewith is a downwardly and outwardly inclined lip 20. On the opposite side of the body and on the other side of the arms 16 is a flange plate 21 of the same width as the body and which projects downwardly at substantially right angles to the body. Struck out from the plate 21 is a finger 22 which is pressed inwardly with the major portion of the finger parallel to the plate. The finger is disposed centrally of the plate and is slightly longer than the plate 21 as shown on FIGURES 3 to 5. The striking out of the finger 22 from an intermediate portion of the plate 21 provides a finger 23 on each side edge of the plate 21. The finger 22 is spaced inwardly from the fingers 23 a distance slightly greater than the thickness of the metal forming the hook-like flange 13 of the molding strip.

In use, a series of molding clips are mounted in spaced relation on the upper part of the rounded section C and in the position substantially as shown in FIGURE 1. The molding strip is engaged by first hooking the flange 12 under the lip 20 of the clip, as indicated on FIGURE 3. Then the clip is given a rocking movement to place the hook-like flange 13 in a position as shown in FIGURE 4 where the edge of the hook-like flange is disposed between the finger 22 and the fingers 23. This necessitates exerting pressure against the arms 16 for flexing them. Consequently when the molding strip is released, the arms 16 bearing against the underside of the molding strip urge the hook-like flange 13 into the spaces between the fingers 22 and 23 to a position substantially as shown on FIGURE 5. In this position, it will be manifest that the nubbins 18 on the free ends of the spring arm 16 press outwardly against the underside of the molding and retain the molding strip in place with the flanges of the molding strip in engagement as above described. This insures an efficient rattle-proof connection between the molding strip and the clips.

Numerous changes in details of construction and arrangement may be effected without departing from the spirit of the invention, especially as defined in the appended claim.

What I claim is:

The combination of a molding strip of generally curved form and having one wall substantially longer transversely than the other wall and each wall having an inturned flange at the free edge, a clip of sheet metal having a body, a fastener on said body for attaching same to a supporting panel, a pair of integral fingers inclining upwardly and outwardly and in opposite lateral directions from said body for resilient engagement with the underside of the molding strip, an integral lip on said body between said fingers and extending downwardly and outwardly for engagement by the flange on the shorter wall of the molding clip, a plate integral with the side of said body opposite from said lip and extending therefrom at an abrupt angle in a direction opposite to said integral fingers, and a finger struck from an intermediate part of said plate to provide a finger on each side thereof, the free edge portion of the intermediate finger being spaced from the adjacent fingers a distance approximately equal to the thickness of the material of the inturned flange on the longer wall of the molding strip, whereby the molding strip is applied to the clip by first engaging the flange on the shorter wall with the lip, rocking the strip and depressing the spring fingers, disposing the flange of the longer wall of the molding strip between the intermediate and adjacent fingers and enabling the spring fingers to urge said last flange into the space between the intermediate and adjacent fingers.

References Cited in the file of this patent

UNITED STATES PATENTS

| | | |
|---|---|---|
| 2,330,675 | Brown | Sept. 28, 1943 |
| 2,959,259 | Meyer | Nov. 8, 1960 |
| 2,981,387 | Dutchik | Apr. 25, 1961 |